US011396606B2

(12) United States Patent
Steele

(10) Patent No.: US 11,396,606 B2
(45) Date of Patent: Jul. 26, 2022

(54) HYDROPHILIC COATING WITH ENHANCED PROPERTIES TO LIMIT REACTIVITY, LIMIT DISSOLUTION, MINIMIZE CONTAMINATION POTENTIAL AND PROVIDE ANTI-FUNGAL PROPERTIES

(71) Applicant: HAMILTON SUNDSTRAND CORPORATION, Charlotte, NC (US)

(72) Inventor: John W. Steele, New Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 597 days.

(21) Appl. No.: 15/605,633

(22) Filed: May 25, 2017

(65) Prior Publication Data

US 2018/0340081 A1 Nov. 29, 2018

(51) Int. Cl.
*C09D 5/14* (2006.01)
*C09D 1/00* (2006.01)
(Continued)

(52) U.S. Cl.
CPC .............. *C09D 5/14* (2013.01); *A01N 59/16* (2013.01); *B01D 53/265* (2013.01); *B64G 1/503* (2013.01); *B64G 1/60* (2013.01); *C09D 1/00* (2013.01); *C09D 5/00* (2013.01); *C09D 7/61* (2018.01); *C09D 7/63* (2018.01); *F28D 1/05325* (2013.01);
(Continued)

(58) Field of Classification Search
CPC ...... A01N 59/16; B01D 53/265; B64G 1/503; B64G 1/60; C08K 2003/168; C08K 3/015; C08K 3/16; C09D 1/00; C09D 5/00; C09D 5/14; C09D 7/61; C09D 7/63; F28D 1/05316; F28D 1/05325; F28D 2021/0021; F28D 2021/0038; F28F 13/187;
(Continued)

(56) References Cited

U.S. PATENT DOCUMENTS 5,264,250 A 11/1993 Steele et al.
5,305,827 A 4/1994 Steele et al.
(Continued)

FOREIGN PATENT DOCUMENTS

CN 105219241 1/2016

OTHER PUBLICATIONS

Sol-gel transition study and pyrolysis of alumina-based gels prepared from alumatrane precursor Bussarin Ksapabutr Colloids and Surfaces A: Physicochem. Eng. Aspects 233 (2004) 145-153 (Year: 2004).*

(Continued)

*Primary Examiner* — Shuangyi Abu Ali
(74) *Attorney, Agent, or Firm* — Snell & Wilmer L.L.P.

(57) ABSTRACT

A hydrophilic coating for use with a heat exchanger includes an insolubilizer configured to provide structure or support for the hydrophilic coating. The hydrophilic coating further includes a wetting agent configured to provide wettability for the hydrophilic coating. The hydrophilic coating further includes an antibacterial agent configured to eliminate at least a portion of bacteria that contacts the hydrophilic coating. The hydrophilic coating further includes an antifungal agent configured to eliminate at least a portion of fungi that contacts the hydrophilic coating, the antifungal agent being different than the antibacterial agent and the insolubilizer.

8 Claims, 2 Drawing Sheets

(51) Int. Cl.

| | |
|---|---|
| *F28F 19/06* | (2006.01) |
| *F28D 1/053* | (2006.01) |
| *A01N 59/16* | (2006.01) |
| *B64G 1/50* | (2006.01) |
| *B64G 1/60* | (2006.01) |
| *C09D 7/61* | (2018.01) |
| *F28F 13/18* | (2006.01) |
| *B01D 53/26* | (2006.01) |
| *F28F 17/00* | (2006.01) |
| *C09D 5/00* | (2006.01) |
| *C09D 7/63* | (2018.01) |
| *F28D 21/00* | (2006.01) |
| *C08K 3/015* | (2018.01) |
| *C08K 3/16* | (2006.01) |

(52) U.S. Cl.
CPC .......... *F28F 13/187* (2013.01); *F28F 17/005* (2013.01); *F28F 19/06* (2013.01); *C08K 3/015* (2018.01); *C08K 3/16* (2013.01); *C08K 2003/168* (2013.01); *F28D 1/05316* (2013.01); *F28D 2021/0021* (2013.01); *F28D 2021/0038* (2013.01); *F28F 2245/02* (2013.01); *F28F 2265/20* (2013.01)

(58) Field of Classification Search
CPC ...... F28F 17/005; F28F 19/06; F28F 2245/02; F28F 2265/20
See application file for complete search history.

(56) References Cited

U.S. PATENT DOCUMENTS

| | | | |
|---|---|---|---|
| 5,562,949 A | 10/1996 | Steele et al. | |
| 5,916,635 A | 6/1999 | Ishii et al. | |
| 6,102,994 A * | 8/2000 | Zhou ................ | C09D 5/14 |
| | | | 106/15.05 |
| 6,170,564 B1 | 1/2001 | Steele et al. | |
| 6,500,490 B1 | 12/2002 | Yan | |
| 6,571,864 B1 | 6/2003 | Yoon et al. | |
| 6,849,568 B2 | 2/2005 | Yan | |
| 8,124,113 B2 | 2/2012 | Peyton et al. | |
| 8,691,254 B2 | 4/2014 | Peyton et al. | |
| 2007/0053946 A1* | 3/2007 | Peyton ................ | A01N 59/16 |
| | | | 424/405 |
| 2007/0231295 A1* | 10/2007 | Hoppe ................ | A01N 25/08 |
| | | | 424/78.09 |
| 2013/0315972 A1* | 11/2013 | Krasnow ............ | A01N 25/12 |
| | | | 424/409 |

OTHER PUBLICATIONS

European Patent Office, European Search Report dated Sep. 26, 2018 in Application No. 18174287.5-1102.
European Patent Office, European Office Action dated Feb. 11, 2020 in Application No. 18174287.5.
Yun Yin Fan et al., Advanced Materials Research 2009, 79-82, 1903-1906, https://www.scientific.net/AMR.79-82.1903.

* cited by examiner

HYDROPHILIC COATING WITH ENHANCED PROPERTIES TO LIMIT REACTIVITY, LIMIT DISSOLUTION, MINIMIZE CONTAMINATION POTENTIAL AND PROVIDE ANTI-FUNGAL PROPERTIES

FIELD

The present disclosure is directed to hydrophilic coatings for use with heat exchangers and, more particularly, to hydrophilic coatings that limit reactivity, limit dissolution, minimize contamination potential, and provide antifungal properties.

BACKGROUND

It is desirable in most environments to conserve resources. Such conservation may be more desirable in environments in which the resources are limited. For example, water on a spacecraft may be in relatively limited supply. In that regard, it may be desirable to conserve water aboard such spacecraft.

Spacecraft may include heat exchangers that transfer heat away from the ambient air. Due to the relatively cool temperature of components of the heat exchangers, moisture may condense on such components. In that regard, a hydrophilic coating may be applied to the heat exchanger to facilitate collection of the condensed moisture such that the moisture may be re-used as drinking or other water.

SUMMARY

Described herein is a hydrophilic coating for use with a heat exchanger. The hydrophilic coating includes an insolubilizer configured to provide structure or support for the hydrophilic coating. The hydrophilic coating further includes a wetting agent configured to provide wettability for the hydrophilic coating. The hydrophilic coating further includes an antibacterial agent configured to eliminate at least a portion of bacteria that contacts the hydrophilic coating. The hydrophilic coating further includes an antifungal agent configured to eliminate at least a portion of fungi that contacts the hydrophilic coating, the antifungal agent being different than the antibacterial agent and the insolubilizer.

In any of the foregoing embodiments, the antifungal agent includes a metal salt that is based on at least one of a transition metal, a post-transition metal, or a metalloid.

In any of the foregoing embodiments, the antifungal agent includes at least one of a zinc chloride or a nickel chloride.

In any of the foregoing embodiments, the insolubilizer is substantially free of a zinc silicate.

In any of the foregoing embodiments, the insolubilizer includes at least one of an organosilane, a zeolite, or a sol-gel-based inorganic oxide.

In any of the foregoing embodiments, use of the insolubilizer in the hydrophilic coating results in the hydrophilic coating having a lower rate of dissolution than another hydrophilic coating that includes the zinc silicate as the insolubilizer.

In any of the foregoing embodiments, products of a reaction between the insolubilizer and a siloxane is substantially free of a dimethylsilanediol (DMSD).

In any of the foregoing embodiments, the wetting agent has a lower rate of absorption per unit than a silica flour.

In any of the foregoing embodiments, the wetting agent includes at least one of an alumina, a titanium oxide, a carbon nanoparticle, or another inorganic oxide.

Also disclosed is a hydrophilic coating for use with a heat exchanger. The hydrophilic coating includes an insolubilizer configured to provide structure or support for the hydrophilic coating, the insolubilizer being selected such that products of a reaction between the insolubilizer and a siloxane is substantially free of a dimethylsilanediol (DMSD). The hydrophilic coating also includes a wetting agent configured to provide wettability for the hydrophilic coating. The hydrophilic coating also includes an antibacterial agent configured to eliminate at least a portion of bacteria that contacts the hydrophilic coating.

Any of the foregoing embodiments may also include an antifungal agent configured to eliminate at least a portion of fungi that contacts the hydrophilic coating and that includes a metal salt that is based on at least one of a transition metal, a post-transition metal, or a metalloid.

In any of the foregoing embodiments, the antifungal agent includes at least one of a zinc chloride or a nickel chloride.

In any of the foregoing embodiments, the insolubilizer is substantially free of a zinc silicate.

In any of the foregoing embodiments, the insolubilizer includes at least one of an organosilane, a zeolite, or a sol-gel-based inorganic oxide.

In any of the foregoing embodiments, use of the insolubilizer in the hydrophilic coating results in the hydrophilic coating having a lower rate of dissolution than another hydrophilic coating that includes the zinc silicate as the insolubilizer.

In any of the foregoing embodiments, the wetting agent has a lower rate of material absorption per unit than a silica flour.

In any of the foregoing embodiments, the wetting agent includes at least one of an alumina, a titanium oxide, a carbon nanoparticle, or another inorganic oxide.

Also disclosed is a hydrophilic coating for use with a heat exchanger. The hydrophilic coating includes an insolubilizer configured to provide structure or support for the hydrophilic coating, the insolubilizer being selected such that products of a reaction between the insolubilizer and a siloxane is substantially free of a dimethylsilanediol (DMSD). The hydrophilic coating also includes a wetting agent configured to provide wettability for the hydrophilic coating, the wetting agent being selected to have a lower rate of material absorption per unit than a silica flour. The hydrophilic coating also includes a silver oxide configured to eliminate at least a portion of bacteria that contacts the hydrophilic coating. The hydrophilic coating also includes an antifungal agent configured to eliminate at least a portion of fungi that contacts the hydrophilic coating.

In any of the foregoing embodiments, the antifungal agent includes a metal salt that is based on at least one of a transition metal, a post-transition metal, or a metalloid, the insolubilizer is substantially free of a zinc silicate, and use of the insolubilizer in the hydrophilic coating results in the hydrophilic coating having a lower rate of dissolution than another hydrophilic coating that includes the zinc silicate as the insolubilizer.

In any of the foregoing embodiments, the antifungal agent includes at least one of a zinc chloride or a nickel chloride, the insolubilizer includes at least one of an organosilane, a zeolite, or a sol-gel-based inorganic oxide, and the wetting agent includes at least one of an alumina, a titanium oxide, a carbon nanoparticle, or another inorganic oxide.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
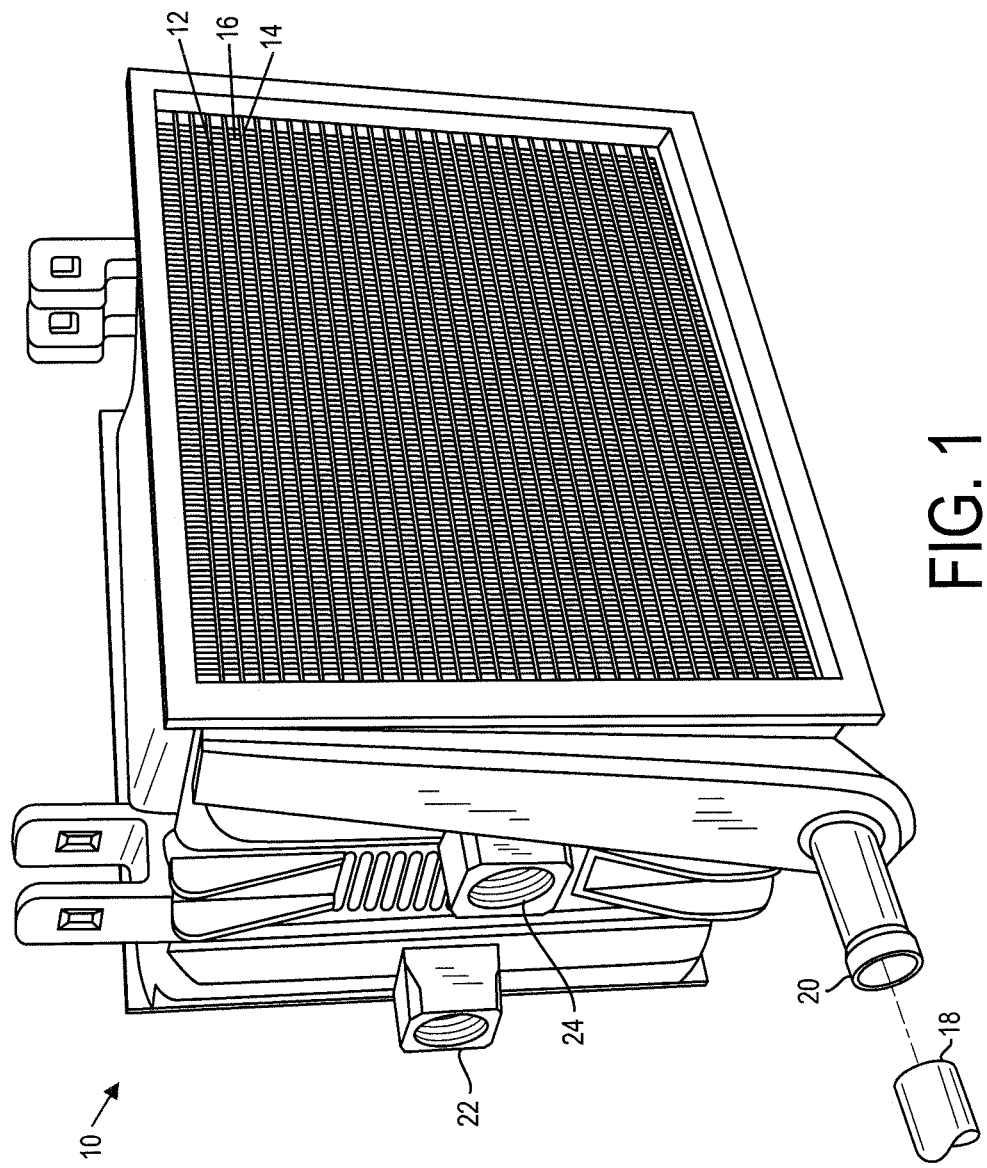
FIG. 1 is a schematic view of an exemplary heat exchanger, in accordance with various embodiments of the present disclosure.

FIG. 1 illustrates selected portions of an example heat exchanger 10. In this example, the heat exchanger 10 includes slurper bars 12 in alternating configuration with cooling tubes 14. Fins 16 separate the slurper bars 12 and cooling tubes 14. The slurper bars 12 collect moisture from passing air and wick the moisture away from an air flow stream through the heat exchanger 10 to prevent condensation and formation of water droplets. The slurper bars 12 are in fluid communication with a vacuum source 18 that is connected to the heat exchanger 10 through a vacuum port 20 in a known manner. Coolant for cooling heat-producing units within a spacecraft (such as a space station or space vehicle), for example, flows through the heat exchanger 10 through respective inlet and outlet ports 22 and 24.

Figure 2:
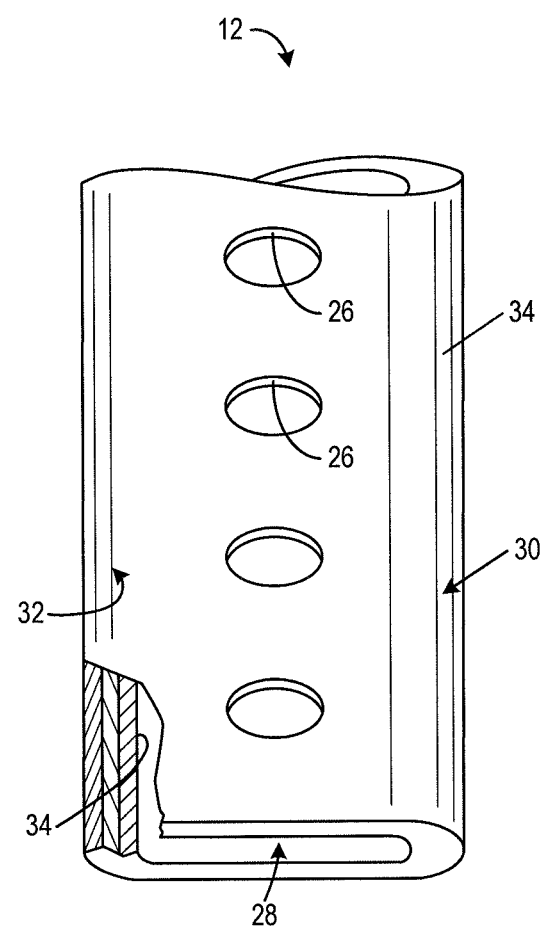
FIG. 2 is a schematic view of an exemplary slurper bar of the heat exchanger of FIG. 1, in accordance with various embodiments of the present disclosure.

Referring to FIG. 2, the slurper bars 12 each include openings 26 that fluidly connect a passage 28 to the passing air flow stream. The vacuum source 18 (FIG. 1) evacuates the passage 28. An outside surface 30 and an inner surface 32 of the passage are coated with a hydrophilic coating 34 that promotes moisture condensation and wicking. The hydrophilic coating 34 is prepared in a slurry. The body of the heat exchanger 10 (i.e., the interior fin-stock) is coated with a fill-and-drain operation using the slurry, and the inner and outer surfaces of the slurper bars 12 are spray coated prior to welding to the heat exchanger 10. After the coatings, the hydrophilic coating 34 is cured (i.e., it is heated for a period of time).

The hydrophilic coating 34 may include various materials or ingredients that perform different functions. For example, the hydrophilic coating 34 may include an insolubilizer that provides structure or support for the hydrophilic coating 34. Stated differently, the insolubilizer may form an inorganic matrix. In that regard, the insolubilizer may be referred to as a "backbone" as it provides structure for the remaining components of the hydrophilic coating 34. The remaining components may be dispersed within the matrix formed by the insolubilizer.

The hydrophilic coating 34 may further include a wetting agent. The wetting agent may provide wettability for the hydrophilic coating 34. For example, the wetting agent may reduce surface tension of moisture that contacts the hydrophilic coating 34, allowing the moisture to flow along the corresponding passage 28 for collection. Stated differently, the wetting agent promotes wetting between condensed water and the hydrophilic coating 34 on the slurper bars 12.

The hydrophilic coating 34 may also include an antimicrobial agent. The antimicrobial agent may eliminate at least a portion of microbes that contact the hydrophilic coating 34. In particular, the hydrophilic coating 34 may include an antibacterial agent and an antifungal agent. The antibacterial agent may eliminate at least a portion of the bacteria that contacts the hydrophilic coating 34. The antifungal agent may eliminate (i.e., kill) at least a portion of fungi that contacts the hydrophilic coating.

The selected components of the hydrophilic coating 34 may provide advantages over conventional hydrophilic coatings. For example, conventional hydrophilic coatings may include zinc silicate as the insolubilizer. In response to contact between the zinc silicate and siloxane, a chemical reaction may occur that produces dimethylsilanediol (DMSD). For example, siloxane may be present in soaps, shampoos, deodorants, and the like, and may separate from their corresponding base component and be present in the air.

While DMSD is relatively unharmful to humans, its presence in water collected from the hydrophilic coating 34 may be detected by a sensor downstream from the hydrophilic coating 34 that detects the presence of organic molecules. A sufficient amount of DMSD in the water may set off an alarm that may thus falsely indicate a harmful amount of organic molecules.

The water collected from the hydrophilic coating 34 may pass through one or more scrubbing beds upstream from the sensor. Due to the properties of DMSD, the scrubbing beds may not remove the DMSD from the water. It may be impractical for the sensor to distinguish DMSD from other molecules. In that regard, a sufficiently high concentration of DMSD may set off the alarm, resulting in the scrubbing beds being replaced before such replacement is necessary.

The insolubilizer of the hydrophilic coating 34 may be selected to include compounds that fail to react with siloxane to generate DMSD. For example, suitable insolubilizers may include one or more of an organosilane, a zeolite, or a sol-gel-based inorganic oxide inorganic oxide. Reaction between such compounds and siloxane present significantly less DMSD than reaction between zinc silicate and siloxane, or may result in formation of no DMSD. For example, reaction between such compounds and siloxane may generate at least a 10 fold reduction in DMSD relative to zinc silicate.

Use of zinc silicate as the insolubilizer may provide additional disadvantages. For example, the insolubilizer may include an inorganic salt. The insolubilizer may be designed to dissolve such that a portion of the inorganic salt is received with the water and eliminates microbes in the water. The water may be received by a water separator downstream from the hydrophilic coating 34.

The heat exchanger 10 may be periodically allowed to dry out. As the water separator is dried, the inorganic salt precipitates from the water and undesirably forms a film on the water separator. Such precipitate may build up on the water separator, reducing functionality of the water separator.

In that regard, it is desirable for the insolubilizer to provide a lower rate of dissolution than another hydrophilic coating that includes zinc silicate as the insolubilizer. For example, it may be desirable for the rate of dissolution caused by the insolubilizer to be at least 10 times less than the rate of dissolution of conventional hydrophilic coatings that include zinc silicate. The suitable compounds described above may provide such relatively low dissolution rates.

Conventional hydrophilic coatings may include silica flour as a wetting agent.

Silica flour provides sufficient wettability for the hydrophilic coating. However, silica flour also functions as an absorbent for hydrophobic contaminants that may alter the state of the hydrophilic coating to be hydrophobic instead of hydrophilic. Such hydrophobic contaminants may include, for example, siloxane, organic acids, fluorocarbons, and relatively long chain hydrocarbons which may be present in ambient air in a spacecraft.

The hydrophilic coating 34 may include a wetting agent that provides a lower rate of absorption of hydrophobic contaminates per unit than silica flour. For example, the wetting agent may provide a rate of absorption of material that is at least 10 times less per unit than the rate of absorption of silica flour. Exemplary wetting agents may include, for example, at least one of alumina, titanium oxide, carbon nanoparticles, or other inorganic oxides which may provide adequate wettability with a reduced affinity for absorbing hydrophobic contaminants.

Conventional hydrophilic coatings may include silver oxide as an antimicrobial agent. Silver oxide provides adequate antibacterial properties. Conventional heat exchangers are periodically allowed to dry in order to reduce or eliminate fungus.

Conventional hydrophilic coatings included silver oxide as an antibacterial agent. To manage invasion of fungi, a crew would allow the heat exchanger to dry out for a period of time. This periodic drying cycle eliminated at least some of the fungi, but presents a logistical burden for the crew.

The hydrophilic coating 34 may include both an antibacterial agent and an antifungal agent to increase the robustness of microbial control. In various embodiments, silver oxide may be included as the antibacterial agent. The antifungal agent may include inorganic salts, such as zinc salt, which fail to reduce performance of the hydrophilic coating 34, are materially compatible with components of the heat exchanger 10 and downstream components, fail to materially impact the ability of the hydrophilic coating 34 to remove potential dissolution products, and fail to materially impact performance of the hydrophilic coating 34. For example, the antifungal agent may include traditional metal inorganic salts that are based on any metal besides a Group 1 metal or a Group 2 metal, as shown on the periodic table of elements. For example, the antifungal agent may include a metal salt based on at least one of a transition metal, a post-transition metal, or a metalloid. Exemplary antifungal agents may include zinc salt or nickel salt, such as zinc chloride or nickel chloride.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat exchanger having a hydrophilic coating, comprising: a plurality of cooling tubes configured to port a coolant; a plurality of slurper bars oriented in an alternating configuration with the plurality of cooling tubes and defining a plurality of passages in fluidic communication with a vacuum source; and the hydrophilic coating being coated on an inner surface and an outer surface of the plurality of passages and including: an insolubilizer including at least one of an organosilane or a zeolite configured to provide structure or support for the hydrophilic coating, a wetting agent including at least one of an alumina, a titanium oxide, a carbon nanoparticle, or another inorganic oxide and configured to provide wettability for the hydrophilic coating, an antibacterial agent configured to eliminate at least a portion of bacteria that contacts the hydrophilic coating, and an antifungal agent including only one metal chloride and configured to eliminate at least a portion of fungi that contacts the hydrophilic coating, the antifungal agent being different than the antibacterial agent and the insolubilizer, the metal chloride consisting of a nickel chloride, wherein: the hydrophilic coating is configured to condense moisture such that the vacuum source collects the condensed moisture from the plurality of passages to be used for drinking water, use of the insolubilizer in the hydrophilic coating results in the hydrophilic coating having a lower rate of dissolution than another hydrophilic coating that includes a zinc silicate as the insolubilizer, and the wetting agent has a lower rate of material absorption per unit than a silica flour.

2. The heat exchanger of claim 1, wherein the antifungal agent includes a metal salt that is based on at least one of a transition metal, a post-transition metal, or a metalloid.

3. The heat exchanger of claim 1, wherein the insolubilizer is substantially free of the zinc silicate.

4. The heat exchanger of claim 1, wherein products of a reaction between the insolubilizer and a siloxane is substantially free of a dimethylsilanediol (DMSD).

5. A heat exchanger having a hydrophilic coating, comprising: a plurality of cooling tubes configured to port a coolant; a plurality of slurper bars oriented in an alternating configuration with the plurality of cooling tubes and defining a plurality of passages in fluidic communication with a vacuum source; and the hydrophilic coating being coated on an inner surface and an outer surface of the plurality of passages and including: an insolubilizer including at least one of an organosilane or a zeolite configured to provide structure or support for the hydrophilic coating, the insolubilizer being selected such that products of a reaction between the insolubilizer and a siloxane is substantially free of a dimethylsilanediol (DMSD), a wetting agent including at least one of an alumina, a titanium oxide, a carbon nanoparticle, or another inorganic oxide and configured to provide wettability for the hydrophilic coating, an antifungal agent including only one metal chloride and configured to eliminate at least a portion of fungi that contacts the hydrophilic coating, the metal chloride consisting of a nickel chloride, and an antibacterial agent configured to eliminate at least a portion of bacteria that contacts the hydrophilic coating, wherein: the hydrophilic coating is configured to condense moisture such that the vacuum source collects the condensed moisture from the plurality of passages to be used for drinking water, use of the insolubilizer in the hydrophilic coating results in the hydrophilic coating having a lower rate of dissolution than another hydrophilic coating that includes a zinc silicate as the insolubilizer, and the wetting agent has a lower rate of material absorption per unit than a silica flour.

6. The heat exchanger of claim 5, wherein the insolubilizer is substantially free of the zinc silicate.

7. A heat exchanger having a hydrophilic coating, comprising: a plurality of cooling tubes configured to port a coolant; a plurality of slurper bars oriented in an alternating configuration with the plurality of cooling tubes and defining a plurality of passages in fluidic communication with a vacuum source; and the hydrophilic coating being coated on an inner surface and an outer surface of the plurality of passages and including: an insolubilizer including at least one of an organosilane or a zeolite configured to provide structure or support for the hydrophilic coating, the insolubilizer being selected such that products of a reaction between the insolubilizer and a siloxane is substantially free of a dimethylsilanediol (DMSD), a wetting agent including at least one of an alumina, a titanium oxide, a carbon nanoparticle, or another inorganic oxide and configured to provide wettability for the hydrophilic coating, the wetting agent being selected to have a lower rate of material absorption per unit than a silica flour, a silver oxide configured to eliminate at least a portion of bacteria that contacts the hydrophilic coating, and an antifungal agent including only one metal chloride and configured to eliminate at least a portion of fungi that contacts the hydrophilic coating, the metal chloride consisting of a nickel chloride, wherein: the hydrophilic coating is configured to condense moisture such that the vacuum source collects the condensed moisture from the plurality of passages to be used for drinking water, and use of the insolubilizer in the hydrophilic coating results in the hydrophilic coating having a lower rate of dissolution than another hydrophilic coating that includes a zinc silicate as the insolubilizer.

8. The heat exchanger of claim 7, wherein:
the antifungal agent includes a metal salt that is based on at least one of a transition metal, a post-transition metal, or a metalloid; and
the insolubilizer is substantially free of the zinc silicate.

* * * * *